(12) United States Patent
Yao

(10) Patent No.: US 8,817,349 B2
(45) Date of Patent: Aug. 26, 2014

(54) PHOTOGRAPHIC HOLOGRAM SYSTEM

(75) Inventor: Ming Tang Yao, New Taipei (TW)

(73) Assignee: E-Lon Optronics Co., Ltd., New Taipei (TW)

( * ) Notice: Subject to any disclaimer, the term of this patent is extended or adjusted under 35 U.S.C. 154(b) by 0 days.

(21) Appl. No.: 13/529,276

(22) Filed: Jun. 21, 2012

(65) Prior Publication Data
US 2013/0271801 A1 Oct. 17, 2013

(30) Foreign Application Priority Data

Apr. 13, 2012 (TW) .............................. 101113346 A

(51) Int. Cl.
*G03H 1/08* (2006.01)
*G03H 1/28* (2006.01)
*G03H 1/00* (2006.01)

(52) U.S. Cl.
USPC ..................... 359/9; 359/24; 359/30

(58) Field of Classification Search
None
See application file for complete search history.

(56) References Cited

U.S. PATENT DOCUMENTS

2002/0171883 A1* 11/2002 Davis et al. ........................ 359/9

* cited by examiner

*Primary Examiner* — Jade R Chwasz
(74) *Attorney, Agent, or Firm* — WPAT, PC; Justin King

(57) ABSTRACT

A photographic hologram system is provided. The use of an image slicing process and/or the arrangement of half-cylindrical lens in the optical path of an optical light wave and upstream of the film is effective to reduce the times of multiple exposures of the film. As a consequence, the brightness of the reconstructed image is enhanced.

15 Claims, 6 Drawing Sheets

PHOTOGRAPHIC HOLOGRAM SYSTEM

FIELD OF THE INVENTION

The present invention relates to a system for forming a hologram, and more particularly to a system for forming an optical hologram.

BACKGROUND OF THE INVENTION

In a conventional optical holographic technology, a portion of a coherent beam is used to irradiate to an object, and the reflected light from the object or the light transmitted through the object is incident to a holographic plate. This light is called as an object beam. Another portion of the coherent beam is projected onto the holographic plate to be used as a reference beam. Since the object beam and the reference beam are from the same coherent beam, the object beam and the reference beam are interfered with each other at the holographic plate to result in many bright and dark interference fringes. The interference pattern recorded on the holographic plate is formed as a hologram. The shape of the interference pattern indicates the phase relationship between the object beam and the reference beam. The bright/dark contrast level of the interference pattern indicates the intensity relationship between the object beam and the reference beam.

Conventionally, a disk-type multiplex holographic system uses a cylindrical lens to generate holograms. Due to the cylindrical lens, the hologram obtained at each shot is a long thin fan-shaped segment. Since the reconstructed image viewed by the observer is the combination of the images that are reconstructed from many small individual segments, the reconstructed image is usually suffered from distortion. Moreover, numerous vertical dark lines are superimposed on the reconstructed image, which is referred as a picket-fence effect.

FIG. 1 schematically illustrates the image exposure regions of the film obtained by an exposure procedure of a conventional disk-type multiplex holographic system. The conventional disk-type multiplex holographic system has a cylindrical lens (not shown). The cylindrical lens and a lens set (not shown) are collaboratively defined as an object beam imaging system. The film 200 is placed right on a focal plane of the object beam imaging system. When the object light wave corresponding to a first image of a target object and the reference light wave overlap on the film 200, these two light waves are interfered with each other to result in a long thin first image exposure region 2001. Similarly, when the object light wave corresponding to a second image of the target object and the reference light wave overlap on the film 200, these two light waves are interfered with each other to result in a long thin second image exposure region 2002. Since the film 200 is placed right on a focal plane of the object beam imaging system, a gap is easily formed between the first image exposure region 2001 and the second image exposure region 2002 if the offset movement of the film 200 is not matched with the width of the exposure region. Under this circumstance, the picket-fence effect occurs.

Moreover, in comparison with the conventional disk-type multiplex holographic system, a conventional image-plane disk-type multiplex holographic system utilizes a simplified optical system because the cylindrical lens is omitted. FIG. 2 schematically illustrates the image exposure regions of the film obtained by an exposure procedure of a conventional image-plane disk-type multiplex holographic system. By multiple exposures, the object image is imaged on a holographic film. As shown in FIG. 2, the film 220 has a first image exposure region 2201 and a second image exposure region 2202, wherein there is a large-area overlapped region 2203 between the first image exposure region 2201 and a second image exposure region 2202. The overlapped region 2203 has been subject to multiple exposures. As the subsequent image is recorded on the film 200, the overlapped region 2203 is continuously subject to many times of exposures. However, due to the multiple exposures of the film 220, the brightness of the reconstructed image is possibly insufficient. Under this circumstance, the holographic image is not aesthetically pleasing, and it is difficult to produce a large-sized reconstructed image.

Therefore, there is a need of providing an approach to solve the problems resulted from the multiple exposures of the film.

SUMMARY OF THE INVENTION

The present invention provides a photographic hologram system for use in a reflection-type color photographic hologram system or a transmission-type color photographic hologram system. A half-cylindrical lens and a lens set of an object beam processing unit are collectively used, wherein the half-cylindrical lens is arranged in the optical path of the object beam and upstream of the film. The arrangement of the half-cylindrical lens is effective to reduce the exposure regions of the interference fringes of the film, which are generated by the object beam and the reference beam. Consequently, the times of multiple exposures of the film are reduced, and the brightness of the reconstructed image is enhanced. In addition, the photographic hologram system can be employed to produce large-sized holograms.

The present invention further provides a photographic hologram system by slicing pixels from the image. In such way, the pixel values of two image frames of a target object are reduced and complementary to each other. The image slicing process is effective to reduce the exposure regions of the interference fringes of the film, which are generated by the object beam and the reference beam. Consequently, the times of multiple exposures of the film are reduced, and the brightness of the reconstructed image is enhanced. In addition, the photographic hologram system can be employed to produce large-sized holograms.

The present invention still provides a photographic hologram system for producing a reference beam carrying the image information of a target object, thereby reducing the exposure regions of the interference fringes of the film, which are generated by the object beam and the reference beam. Consequently, the times of multiple exposures of the film are reduced, and the brightness of the reconstructed image is enhanced. In addition, the photographic hologram system can be employed to produce large-sized holograms.

In accordance with an aspect of the present invention, there is provided a photographic hologram system. The photographic hologram system includes an illumination unit, a beam splitting unit, a reference beam processing unit, an image generating unit, an object beam processing unit, and a film. The illumination unit is used for providing a coherent beam. The beam splitting unit is used for splitting the coherent beam into a reference beam and an object beam. The reference beam processing unit is used for receiving the reference beam and outputting a reference light wave with respect to the reference beam. The image generating unit is used for providing a first image and a second image of a target object. The object beam processing unit includes an object beam imaging system for guiding the object beam to the image generating unit, thereby generating an object light wave. In addition, the object beam imaging system includes a half-cylindrical lens, and the object light wave carries an image information of the first image and the second image following in time. When the reference light wave and the object light wave are incident to the film, the reference light wave and the object light wave are interfered with each other to result in a plurality of interference fringes of two-dimensional area on the film. The object light wave is directed from the object beam imaging system to the film through the half-cylindrical lens. The film is located within a depth-of-field range and near a focal plane distance of the object beam imaging system, but the film is not located at the focal plane distance. The portion of the interference fringes of the two-dimensional area with respect to the first image is overlapped with a portion of said interference fringes of the two-dimensional area with respect to the second image.

In an embodiment, the image generating unit further captures said first image and said second image with the preset number of capture pixels, and processes said first image and said second image with the preset number of projection pixels, then the processed multiple image frames are recorded on the film, wherein the number of projection pixels is lower than the number of capture pixels, and the image information of the first image and second image with the preset number of projection pixels are complementary to each other.

In an embodiment, the illumination unit includes a gas laser beam generator, a carbon dioxide laser beam generator, a liquid laser beam generator, a solid laser beam generator, or a semiconductor laser beam generator.

In an embodiment, the coherent beam is a visible beam or an invisible beam.

In an embodiment, the beam splitting unit comprises a beam splitter.

In an embodiment, the image generating unit includes an image-processing electronic device for performing a color separating operation on the first image or the second image, thereby outputting a first monochromatic component image and a second monochromatic component image. A first monochromatic color of the first monochromatic component image is different from a second monochromatic color of the second monochromatic component image.

In an embodiment, the object beam processing unit further includes an angle adjustable element for adjusting an included angle between the object light wave and the reference light wave, so that the included angle corresponding to the first monochromatic component image is different from the included angle corresponding to the second monochromatic component image.

In an embodiment, the first image or the second image comprises multiple image frames of the target object, and the multiple image frames of the target object are captured from multiple viewpoints.

In an embodiment, the film has a planar shape, a disc-type shape, a cylindrical shape or a conical shape.

In an embodiment, the reference beam processing unit further includes an image generator. After the reference beam is guided to the image generator, the reference light wave generated by the reference beam processing unit carries image information of the first image and the second image following in time.

In accordance with another aspect of the present invention, there is provided a photographic hologram system. The photographic hologram system includes an illumination unit, a beam splitting unit, a reference beam processing unit, an image generating unit, an object beam processing unit and a film. the image generating unit further captures multiple image frames of a target object with the preset number of capture pixels, and processes the multiple image frames with the preset number of projection pixels, then the processed multiple image frames are recorded on the film, wherein the number of projection pixels is lower than the number of capture pixels, and multiple image information of the multiple image frames with the preset number of projection pixels are complementary to each another, and the recorded multiple image frames on the film are have a plurality of two-dimensional area overlapped each another.

In an embodiment, the object beam processing unit further includes a half-cylindrical lens. An object light wave is directed from the image generating unit to the film through the half-cylindrical lens. The object light wave carries the image information of the each image at the projection pixel or the image information of every said image frame at the projection pixel.

In an embodiment, the film is located within a depth-of-field range and near a focal plane distance of an object beam imaging system including the half-cylindrical lens.

In an embodiment, the reference beam processing unit further includes an image generator. After a portion of a coherent beam from the beam splitting unit is guided to the image generator, the reference beam processing unit generates a reference light wave carrying image information of the target object and directing the reference light wave to the film.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a photographic hologram system. The photographic hologram system may be employed to synthesize various holograms such as rainbow holograms, reflection holograms, multi-viewpoint holograms, true color holograms or integral holograms according to different imaging principles. The present invention will be illustrated by referring to a photographic hologram system for synthesizing a specified hologram. It is to be noted that the following descriptions of preferred embodiments of this invention are presented herein for purpose of illustration and description only.

In this context, the term "reference beam angle" denotes an included angle between a reference beam and a normal line of the film. In a case that the film is planar, the film has a single normal line. Whereas, in a case that the film is rolled as a cylindrical shape or a conical shape, the film has multiple normal lines. The definition of the reference beam angle may be varied according to the practical requirements. For example, the term "reference beam angle" may denote an included angle between the reference beam and a tangent plane of the film. In the following embodiments, the reference beam angle is a fixed angle.

Figure 1:
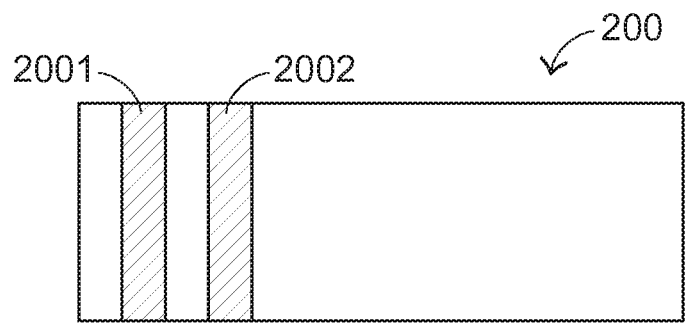
FIG. 1 schematically illustrates the image exposure regions of the film obtained by an exposure procedure of a conventional disk-type multiplex holographic system.
Figure 2:
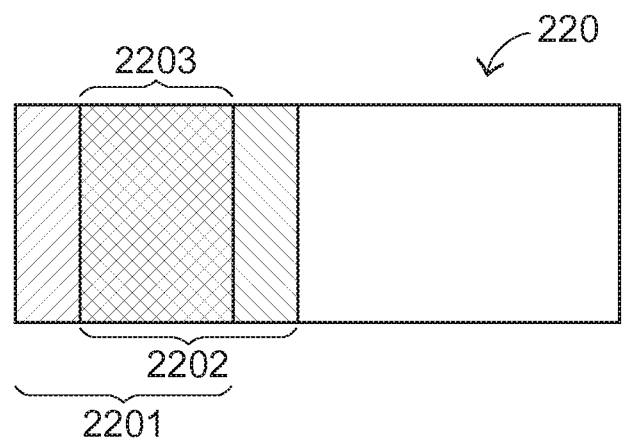
FIG. 2 schematically illustrates the image exposure regions of the film obtained by an exposure procedure of a conventional image-plane disk-type multiplex holographic system.
Figure 3:
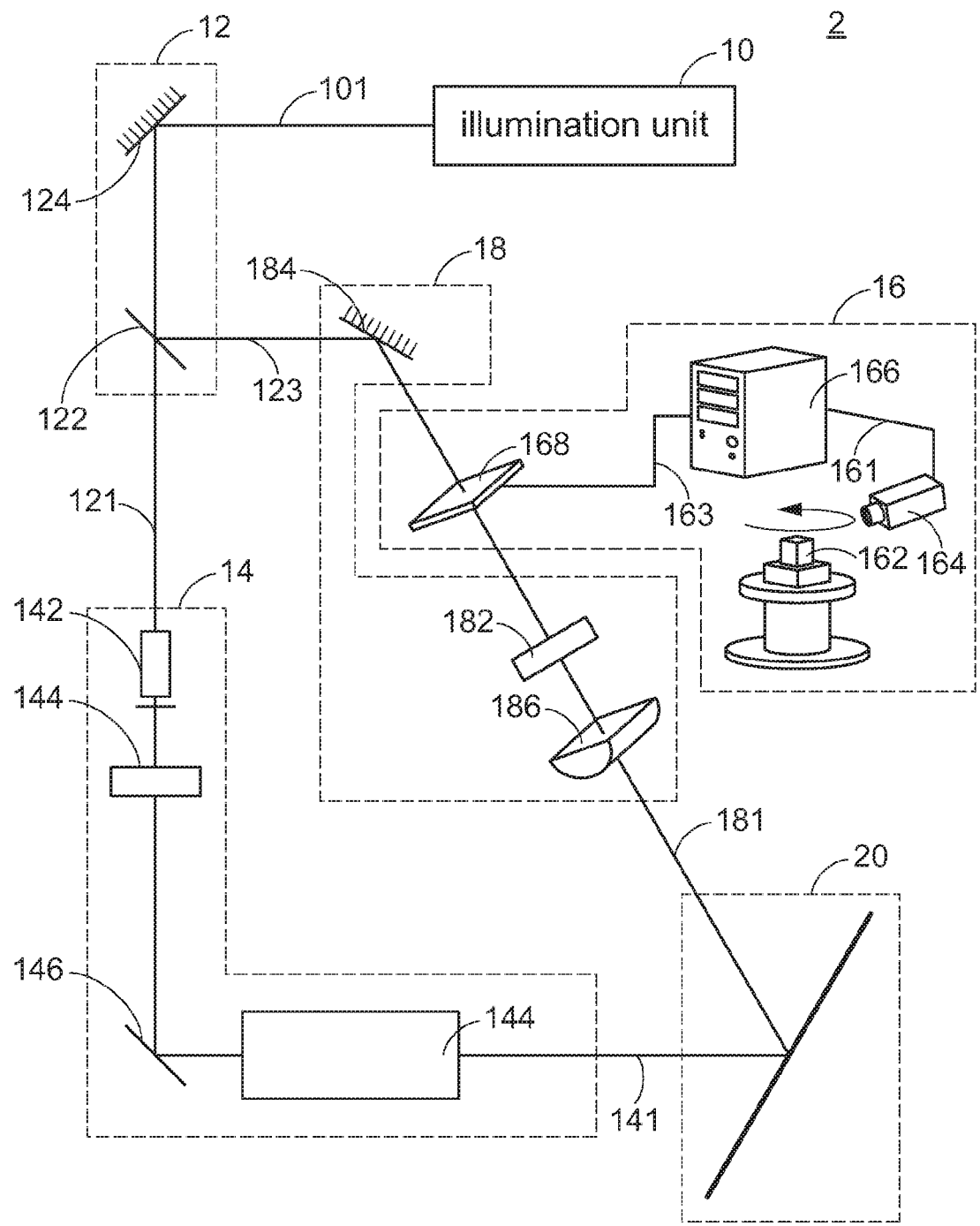
FIG. 3 schematically illustrates the architecture of a photographic hologram system according to a first embodiment of the present invention.

FIG. 3 schematically illustrates the architecture of a photographic hologram system according to a first embodiment of the present invention. As shown in FIG. 3, the photographic hologram system 2 comprises an illumination unit 10, a beam splitting unit 12, a reference beam processing unit 14, an image generating unit 16, an object beam processing unit 18, and a film 20.

The illumination unit 10 is used for providing a coherent beam 101. For example, the illumination unit 10 may be any kind of laser beam generator for emitting a coherent laser beam 101. Dependent on the medium of the laser beam generator, the laser beam generator includes for example a gas laser beam generator (e.g. a helium-neon laser beam generator), a carbon dioxide laser beam generator, a liquid laser beam generator, a solid laser beam generator, or a semiconductor laser beam generator. Depending on the wavelength of the laser beam, the laser beam may be a visible laser beam or an invisible laser beam.

After the coherent beam 101 from the illumination unit 10 is received by the beam splitting unit 12, the coherent beam 101 is split into a reference beam 121 and an object beam 123. The beam splitting unit 12 may comprise a beam splitter (BS) 122. Moreover, the beam splitting unit 12 may further comprise a plurality of optical elements. For example, a reflective mirror 124 is located at a proper position to guide the coherent beam 101. In other words, the beam splitting unit 12 is used for splitting the coherent beam 101 into the reference beam 121 and the object beam 123.

The reference beam 121 from the beam splitting unit 12 is received by the reference beam processing unit 14. Moreover, with respect to the reference beam 121, the reference beam processing unit 14 outputs a reference light wave 141. In an embodiment, the reference beam processing unit 14 comprises a spatial filter (SF) 142 for eliminating the adverse influence of the spatial noise on the reference beam 121. For example, the spatial filter 142 is composed of a confocal plane distance convex lens set and a pin hole. The composition of the spatial filter 142 is not limited to the combination of the confocal plane distance convex lens set and the pin hole. Moreover, the reference beam processing unit 14 may comprise other optical elements for guiding or optimizing the reference beam 121 in order to output the reference light wave 141. For example, these optical elements comprise a reflective mirror 146, a lens set 144 with different focal lengths of lens, or the like. The reference beam processing unit 14 may further comprise a light-adjustable part such as an amplitude adjustable part, a phase adjustable part or an angle adjustable part. After the reference beam 121 is processed by the reference beam processing unit 14, the reference light wave 141 is outputted from the reference beam processing unit 14. By adjusting an incident angle of the reference light wave 141 with respect to the film 20, the reference light wave 141 will be incident to the film 20 at a reference beam angle.

The image generating unit 16 is used for providing at least one image. In this context, the term "image" denotes an image of a target object 162 captured from a single viewpoint or multiple images frames of the target object 162 captured from multiple viewpoints. Moreover, the target object 162 may be monochromatic or polychromatic, or the target object 162 may have gray levels. In an embodiment, the image generating unit 16 comprises an image pickup device 164, an image-processing electronic device 166, and a display device 168. For example, the image pickup device 164 is a CCD camera for capturing the image of the target object 162 from one viewpoint or capturing multiple images frames of the target object 162 from multiple viewpoints. Moreover, the position of the image pickup device 164 or the target object 162 is adjustable, so that the image of the target object 162 may be captured by the image pickup device 164 from a desired viewpoint. For example, the image-processing electronic device 166 is a computer for receiving the image 161 from the image pickup device 164 and processing the image 161.

Figure 4:
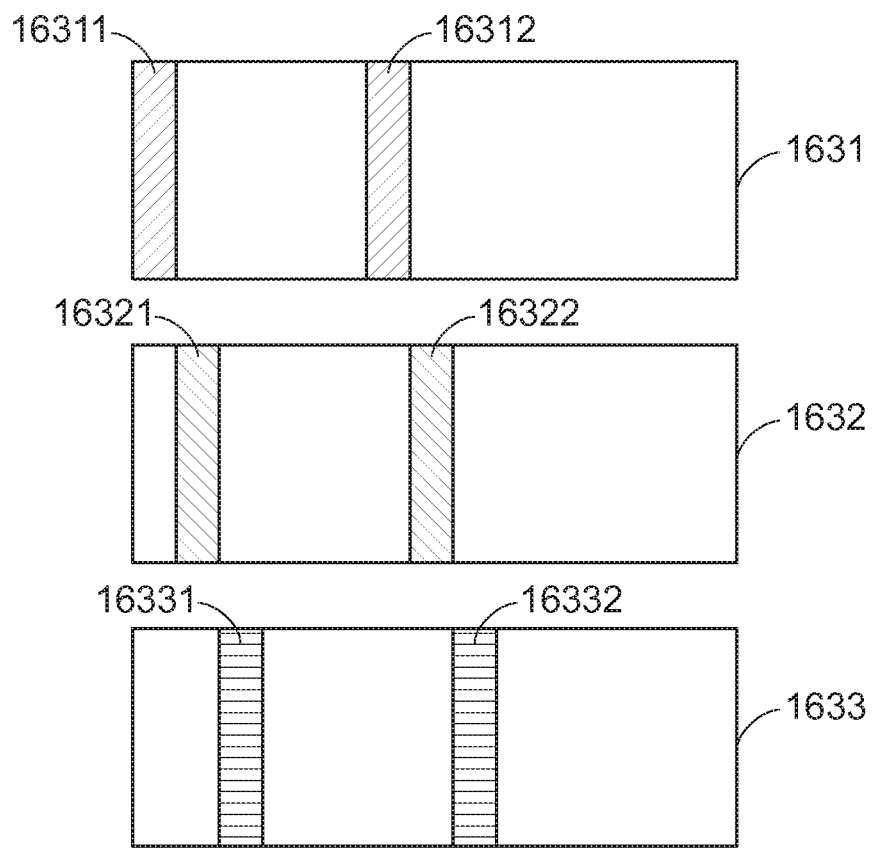
FIG. 4 schematically illustrates the projection image obtained by the photographic hologram system according to the first embodiment of the present invention.

FIG. 4 schematically illustrates the projection image obtained by the photographic hologram system according to the first embodiment of the present invention. As shown in FIG. 4, multiple images frames are captured from multiple viewpoints. In accordance with a feature of the present invention, the times of multiple exposures of the film are reduced by decreasing the pixel number of the image. The method of decreasing the pixel number of the image may be performed by a processing process of slicing pixels from the image (also referred hereinafter as an image slicing process). For example, if three successive image frames of the target object 161 in the 10×10 capture pixel arrangement are captured by the image pickup device 164, these three image frames will be sequentially processed into the images 163 by the image slicing process. That is, according to the capturing sequence, a processed first image frame 1631, a processed second image frame 1632 and a processed third image frame 1633 are sequentially outputted as the image 163 after the image slicing process is performed. As shown in FIG. 4, if the image 163 is the processed first image frame 1631, only the projection pixels 16311 and 16312 are retained; if the image 163 is the processed second image frame 1632, only the projection pixels 16321 and 16322 are retained; and if the image 163 is the processed third image frame 1633, only the projection pixels 16331 and 16332 are retained. These projection pixels are 16311, 16312, 16321, 16322, 16331 and 16332 are complementary image informations for building up the entire multi-viewpoint image. Consequently, after the image slicing process is performed, the pixel value of the projection pixels of each processed image frame 1631, 1632, 1633 (i.e. the image 163) is lower than the pixel value of the capture pixels, but each processed image frame has the entire contour of the target object 162. In other words, according to the photographic hologram system of the present invention, the pixel number is regularly decreased and the complementary image informations should be taken into consideration. Moreover, the pixel number of the projection pixels to be retained in each image frame may be determined according to the practical requirements.

In practice, after the image slicing process is performed, the reconstructed image is not obviously inconsistent. On the other hand, since the pixel number of each image frame is reduced, the times of multiple exposures of the film in the subsequent processes may be reduced. Consequently, the hologram of the present invention can provide the effects that many of the conventional holograms fail to present because of excessive exposure times, or the hologram of the present invention can solve the drawbacks of the conventional hologram from small size and insufficient brightness.

Please refer to FIG. 3 again. For example, the display device 168 is a LCD screen for displaying the processed image 163 of the image-processing electronic device 166. In a case that the image slicing process is performed, the image 163 comprises the processed image frames that are sequentially captured at different viewpoints. Alternatively, in a case that a color separating operation is performed, the image 163 may comprise a first monochromatic component image, a second monochromatic component image and a third monochromatic component image.

Moreover, by the object beam processing unit 18, the object beam 123 from the beam splitting unit 12 is guided to the image generating unit 16, thereby generating an object light wave 181. In this embodiment, the object beam processing unit 18 comprises several optical elements. The optical elements include but are not limited to a lens set 182, a reflective mirror 184, or the like. By these optical elements, the object beam 123 is guided to the image generating unit 16, thereby imaging the object beam 123 as the object light wave 181 and outputting the object light wave 181.

Figure 5:
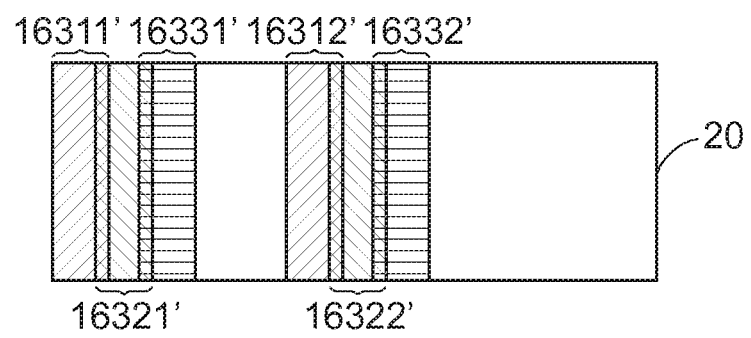
FIG. 5 schematically illustrates the exposure interference regions of the film obtained by a first exposure procedure of the photographic hologram system according to the first embodiment of the present invention.

FIG. 5 schematically illustrates the exposure interference regions of the film obtained by a first exposure procedure of the photographic hologram system according to the first embodiment of the present invention. When the object light wave 181 corresponding to the image frame 1631 and the reference light wave 141 overlap on the film 20, these two light waves are interfered with each other to result in the exposure interference regions 16311' and 16312'. The exposure interference region 16311' records the image information of the pixel 16311. The exposure interference region 16312' records the image information of the pixel 16312. Since the object light wave 181 has been processed by the image slicing process, no interference patterns are generated at the regions other than the exposure interference regions 16311' and 16312'. Similarly, when the object light wave 181 corresponding to the image frame 1632 and the reference light wave 141 overlap on the film 20, the exposure interference regions 16321' and 16322' are generated. Similarly, when the object light wave 181 corresponding to the image frame 1633 and the reference light wave 141 overlap on the film 20, the exposure interference regions 16331' and 16332' are generated. From the above discussions, the image processing method of the present invention is capable of reducing the times of multiple exposures of the film at the positions with no projection pixels.

As mentioned above, the photographic hologram system of the present invention utilizes the image slicing process to process the image. Furthermore, the object beam processing unit 18 may further comprise a half-cylindrical lens 186 (see FIG. 3). The half-cylindrical lens 186 is arranged in the optical path of the optical light wave 181 and upstream of the film 20. The reference light wave 141 and the object light wave 181 are incident to the film 20 to result in a plurality of interference fringes on the film 20. As previously described, in the conventional disk-type multiplex holographic system, the object beam imaging system comprises a cylindrical lens, but the film is placed right on the focal plane of the object beam imaging system. Consequently, an undesired picket-fence effect occurs. Moreover, in the conventional image-plane disk-type multiplex holographic system, the cylindrical lens is omitted and the object image is imaged on a holographic film by multiple exposures. However, too many times of the multiple exposures of the film are still undesirable.

Figure 6:
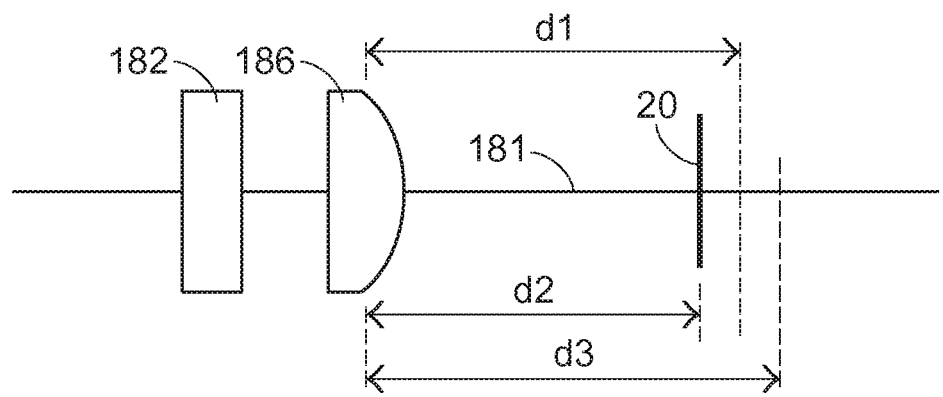
FIG. 6 schematically illustrates the relative locations of the object beam processing unit and the film in the photographic hologram system according to the first embodiment of the present invention.

FIG. 6 schematically illustrates the relative locations of the object beam processing unit and the film in the photographic hologram system according to the first embodiment of the present invention. The half-cylindrical lens 186 and the corresponding lens set 182 of the object beam processing unit 18 are collaboratively defined as an object beam imaging system. The focal plane is located within a specified distance from the object beam imaging system. As shown in FIG. 6, the focal plane is separated from the half-cylindrical lens 186 by a focal plane distance d1. In accordance with a key feature of the present invention, the film 20 is not placed on the focal plane of the object beam imaging system to result in the interference. That is, the film 20 is not separated from the half-cylindrical lens 186 by the focal plane distance d1. Whereas, the film 20 is located around the focal plane. That is, the film 20 is separated from the half-cylindrical lens 186 by a defocal distance d2 or d3 exclusive of the right focal distance d1. In other words, the film 20 is located within a depth-of-field range of the object beam imaging system (i.e. the range between d2 and d3). When the film 20 is placed at the defocal distance, the reconstructed holographic image is still recognizable by the human eyes through the interference fringes resulted from the object light wave and the reference light wave.

Figure 7:
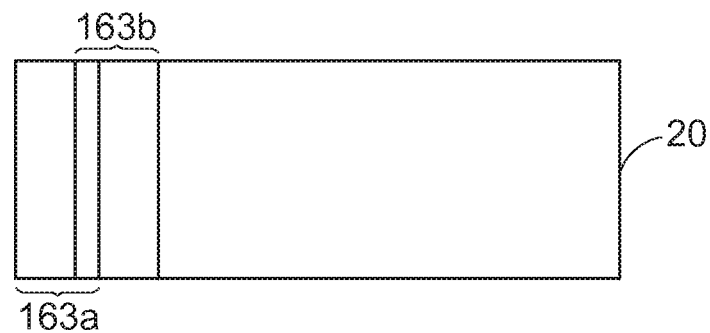
FIG. 7 schematically illustrates the exposure interference regions of the film obtained by a second exposure procedure of the photographic hologram system according to the first embodiment of the present invention.

FIG. 7 schematically illustrates the exposure interference regions of the film obtained by a second exposure procedure of the photographic hologram system according to the first embodiment of the present invention. In this embodiment, the half-cylindrical lens 186 and the corresponding lens set 182 are collaboratively defined as the object beam imaging system. The film 20 is located within a depth-of-field range of the object beam imaging system exclusive of the right focal plane distance. As shown in FIG. 7, two exposure interference regions 163a and 163b are formed on the film 20. The exposure interference regions 163a and 163b are exposure interference regions corresponding to a first image and a second image of a target object captured from different viewpoints. The first image and the second image have been subject to the image slicing process or have not been subject to the image slicing process. Moreover, by the object beam imaging system including the half-cylindrical lens 186 and the corresponding lens set 182, the areas of the exposure interference regions 163a and 163b of the film 20 are smaller than the conventional object beam imaging system without the half-cylindrical lens or the cylindrical lens. Consequently, the times of multiple exposures of the film are reduced, and the brightness of the reconstructed image is enhanced. From the above discussions, the object beam imaging system of the present invention is capable of reducing the times of multiple exposures of the film. In addition, since the film is located within the depth-of-field range of the object beam imaging system, the picket-fence effect can be effectively eliminated. Under this circumstance, the reconstructed holographic image is recognizable by the human eyes through the interference recorded on the film.

It is noted that the arrangement of the half-cylindrical lens 186 or the use of the image slicing process is effective to reduce the times of multiple exposures of the film. As for the single-frame image or the image with less number of image frames, either the arrangement of the half-cylindrical lens 186 or the use of the image slicing process is feasible. As for the image with multiple image frames, the arrangement of the half-cylindrical lens 186 and the use of the image slicing process are simultaneously applied to the photographic hologram system. Consequently, a bright and clear reconstructed image can be obtained.

Since the use of the image slicing process and the arrangement of the half-cylindrical lens can reduce the times of multiple exposures of the film, the applications of the photographic hologram system can be expanded. For example, the image can be recorded on specified positions of the film 20. For example, if the film 20 is a disc-type film, the image may be recorded on specified radius positions of the disc-type film. Moreover, since the images of different target objects may be recorded on different radius positions, an image in a racetrack arrangement may be generated. After the image is reconstructed, the target images recorded on different tracks may be observed. Consequently, the reconstructed image is more diverse.

For example, since multiple exposures of the film result in deteriorated diffraction efficiency, the conventional photographic hologram system may only produce small-sized holograms of the target object. However, since the image slicing process is adopted by the photographic hologram system of the present invention, the times of multiple exposures of the film will be reduced, or even a multi-channel image of the target object can be produced, or a multi-viewpoint image can be produced to result in the dynamic effect. As for the image reconstructing efficacy, the observer can view the reconstructed image from the 15-degree viewpoint to the 45-degree viewpoint, or different observers in front of the film can view different reconstructed images.

Figure 8:
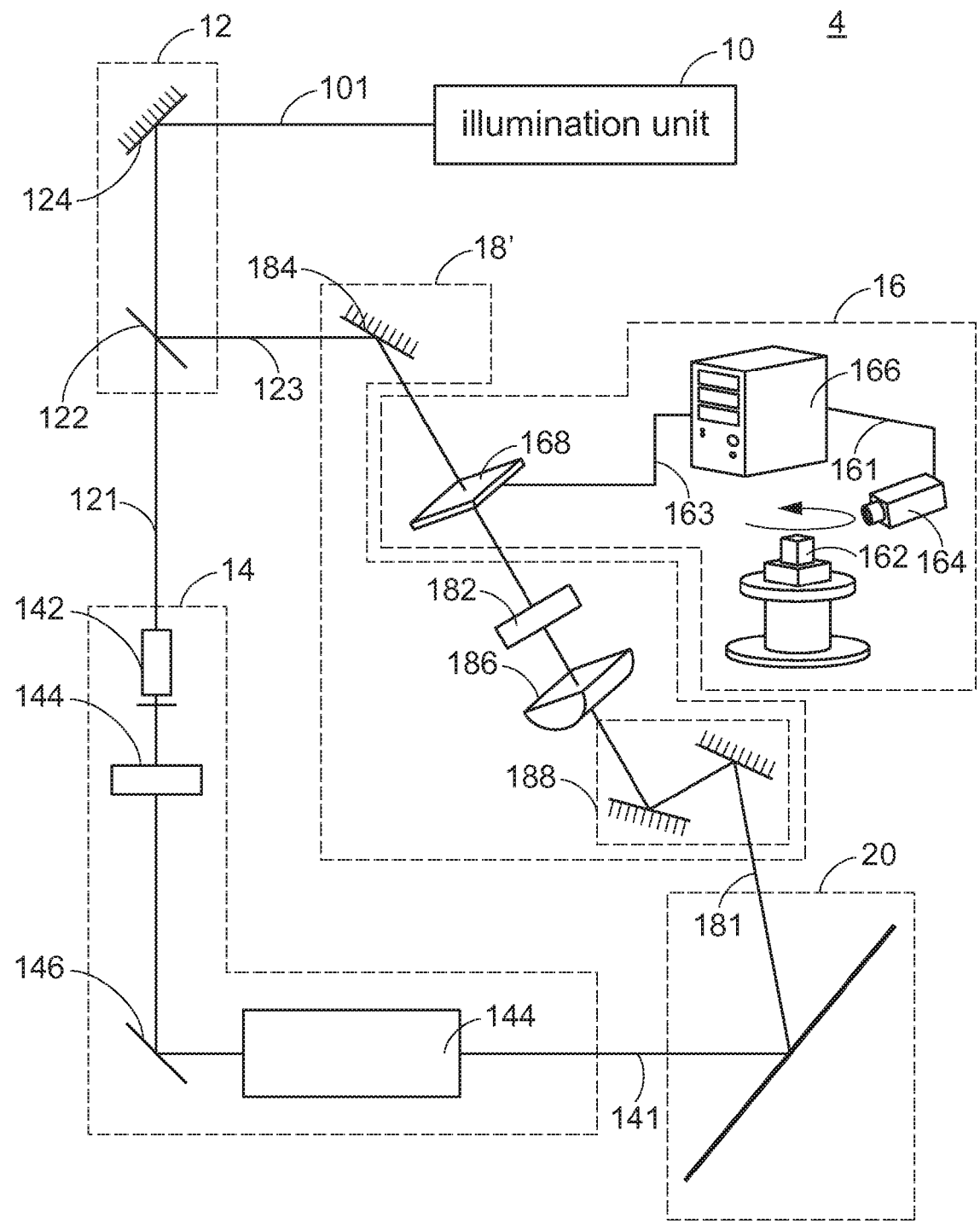
FIG. 8 schematically illustrates the architecture of a photographic hologram system according to a second embodiment of the present invention.

FIG. 8 schematically illustrates the architecture of a photographic hologram system according to a second embodiment of the present invention. The photographic hologram system 4 is capable of performing a color separating operation on the image 161 of a colorful target object 162. Consequently, various color pixels of the image 161 are separated, and respective color pixels are combined as a first monochromatic component image and a second monochromatic component image. The first monochromatic color of the first monochromatic component image is different from the second monochromatic color of the second monochromatic component image. For example, the image may be separated into a red color two-dimensional image, a green color two-dimensional image and a blue color two-dimensional image, which are respectively served as the first monochromatic component image, the second monochromatic component image and the third monochromatic component image.

For the colorful target object 162, the object beam processing unit 18' further comprises an angle adjustable element 188. For example, t For example, the angle adjustable element 188 comprises one or more reflective mirrors or them equipped with driving module (not shown), and the incident angle of the object light wave 181 with respect to the film 20 is adjusted. For example, if the first monochromatic component image is a red component image and the second monochromatic component image is a green component image, the incident angle of the object light wave 181 with respect to the film 20 may be adjusted by the angle adjustable element 188. Consequently, there is a first included angle between the object light wave 181 corresponding to the red component image and the reference light wave 141, and there is a second included angle between the object light wave 181 corresponding to the green component image and the reference light wave 141. Similarly, if the third monochromatic component image is a blue component image, there is a third included angle between the object light wave 181 corresponding to the blue component image and the reference light wave 141. Since the incident angle of the reference light wave 141 with respect to the film 20 is unchanged, only the incident angles of the object light wave 181 corresponding to different color component images are adjusted. Moreover, the exposure regions of the film 20 corresponding to the three color component images may be identical, partially superimposed or non-superimposed.

As known, it is difficult to adjust the optical system of the photographic hologram system. Once an optical element is adjusted after the optical system is established, the process of reconstructing the optical path is very time-consuming. For solving this drawback, before the object light wave is incident to the film, the photographic hologram system of the present invention utilizes the angle adjustable element 188 to adjust the incident angle of the object beam. This adjusting way has many benefits. For example, the imaging optical system may be kept unchanged in order to reduce the time of reconstructing the optical path. Moreover, as mentioned above, by adjusting the included angle between the individual monochromatic component image and the reference light wave that has the fixed incident angle, the object light wave and the reference light wave are incident to the film to result in interference fringes. When the image is reconstructed from the film, since the reference beam source is fixed, the reconstructed image shows the color effect.

Figure 9:
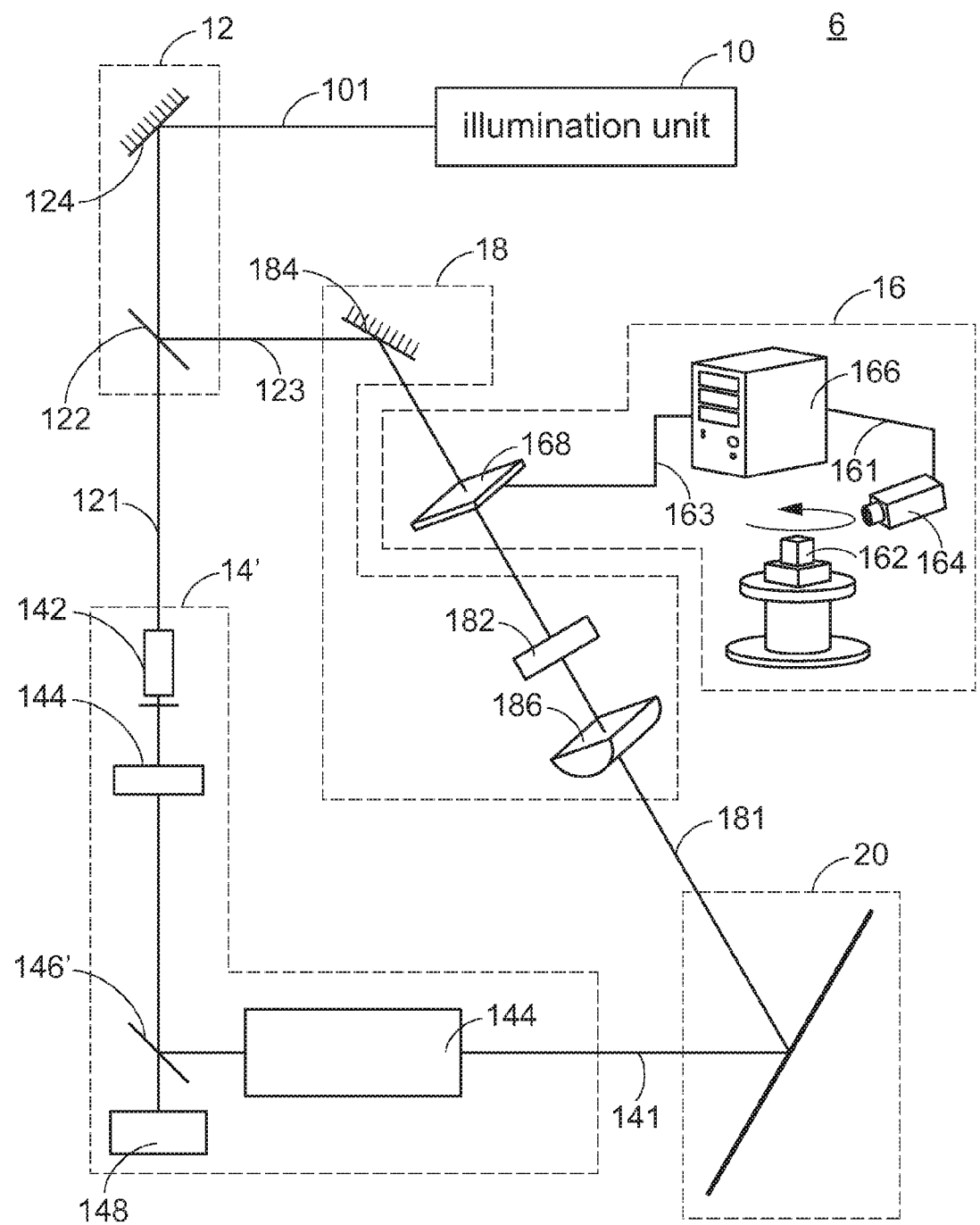
FIG. 9 schematically illustrates the architecture of a photographic hologram system according to a third embodiment of the present invention.

FIG. 9 schematically illustrates the architecture of a photographic hologram system according to a third embodiment of the present invention. In comparison with the first embodiment, the reference beam processing unit 14' of the photographic hologram system 6 of this embodiment further comprises an image generator 148. After the reference beam 121 is guided to the image generator 148 through the optical elements 146' and then passes through the lens set 144, the generated reference light wave 141 will carry the image information of the target object. In such way, the percentage of the reference light wave 141 that is outside the target image to be incident to the film 20 will be reduced. Under this circumstance, the undesired interference fringes and the times of multiple exposures are both reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A photographic hologram system, comprising:
  an illumination unit for providing a coherent beam;
  a beam splitting unit for splitting said coherent beam into a reference beam and an object beam;
  a reference beam processing unit for receiving said reference beam and outputting a reference light wave with respect to said reference beam;
  an image generating unit for providing a first image and a second image of a target object;
  an object beam processing unit comprising an object beam imaging system for guiding said object beam to said image generating unit, thereby generating an object light wave, wherein said object beam imaging system comprises a half-cylindrical lens, and said object light wave carries an image information of said first image and said second image following in time; and
  a film;
  wherein said half-cylindrical lens is positioned directly in front of said film, and when said reference light wave and said object light wave are incident to said film, said reference light wave and said object light wave are interfered with each other to result in a plurality of interference fringes of two-dimensional areas with respect to said first image and with respect to said second image on said film, wherein said object light wave is directed from said image generating unit to said film through said half-cylindrical lens, wherein, exclusive of being located right on said focal plane distance, said film is located within a depth-of-field range around a focal plane distance of said object beam imaging system, and a portion of said interference fringes of said two-dimensional area with respect to the first image is overlapped with a portion of said interference fringes of said two-dimensional area with respect to the second image.

2. The photographic hologram system according to claim 1, wherein said image generating unit further captures said first image and said second image with the preset number of capture pixels, and processes said first image and said second image with the preset number of projection pixels, then said processed first image and second image are recorded on said film, wherein the number of projection pixels is lower than the number of capture pixels, and said image information of said first image and second image with the preset number of projection pixels are complementary to each other.

3. The photographic hologram system according to claim 1, wherein said illumination unit comprises a gas laser beam generator, a liquid laser beam generator, a solid laser beam generator, or a semiconductor laser beam generator.

4. The photographic hologram system according to claim 1, wherein said coherent beam is a visible beam or an invisible beam.

5. The photographic hologram system according to claim 1, wherein said beam splitting unit comprises a beam splitter.

6. The photographic hologram system according to claim 1, wherein said image generating unit comprises an image-processing electronic device for performing a color separating operation on said first image or said second image, thereby outputting a first monochromatic component image and a second monochromatic component image, wherein a first monochromatic color of said first monochromatic component image is different from a second monochromatic color of said second monochromatic component image.

7. The photographic hologram system according to claim 6, wherein said object beam processing unit further comprises an angle adjustable element for adjusting an included angle between said object light wave and said reference light wave, so that said included angle corresponding to said first monochromatic component image is different from said included angle corresponding to said second monochromatic component image.

8. The photographic hologram system according to claim 1, wherein said first image or said second image comprises multiple image frames of said target object, and said multiple image frames of said target object are captured from multiple viewpoints.

9. The photographic hologram system according to claim 1, wherein said film has a planar shape, a disc-type shape, a cylindrical shape or a conical shape.

10. The photographic hologram system according to claim 1, wherein said reference beam processing unit further comprises an image generator, wherein after said reference beam is guided to said image generator, said reference light wave generated by said reference beam processing unit carries image information of said first image and said second image following in time.

11. A photographic hologram system comprising:
an illumination unit;
a beam splitting unit;
a reference beam processing unit;
an image generating unit;
an object beam processing unit; and
a film;
wherein said image generating unit captures multiple image frames of of a target object with the preset number of capture pixels, and processes said multiple image frames with the preset number of projection pixels, then said processed multiple image frames are recorded on said film, wherein the number of projection pixels is lower than the number of capture pixels, and multiple image information of said multiple image frames with the preset number of projection pixels are complementary to each another, and said recorded multiple image frames on said film have a plurality of two-dimensional areas respectively with respect to said multiple image frames and at least a portion of each said two-dimensional area with respect to one of said multiple image frames is overlapped with said another two-dimensional area.

12. The photographic hologram system according to claim 11, wherein said object beam processing unit further comprises a half-cylindrical lens, wherein an object light wave is directed from said image generating unit to said film through said half-cylindrical lens, wherein said object light wave carries a first image information of a first image of said multiple image frames at said projection pixel or a second image information of a second image of said multiple image frames at said projection pixel.

13. The photographic hologram system according to claim 12, wherein said film is located within a depth-of-field range around a focal plane distance of an object beam imaging system including said half-cylindrical lens.

14. The photographic hologram system according to claim 13, wherein said film is not located right at said focal plane distance.

15. The photographic hologram system according to claim 11, wherein said reference beam processing unit further comprises an image generator, wherein after a portion of a coherent beam from said beam splitting unit is guided to said image generator, said reference beam processing unit generates a reference light wave carrying an image information of said target object and directing said reference light wave to said film.

* * * * *